United States Patent
Ahmad

(10) Patent No.: US 6,735,680 B2
(45) Date of Patent: May 11, 2004

(54) METHOD AND APPARATUS FOR DELETING OBJECTS FROM MEMORY WITHIN A SMART CARD

(75) Inventor: Saqib J. Ahmad, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 181 days.

(21) Appl. No.: 10/154,868

(22) Filed: May 24, 2002

(65) Prior Publication Data

US 2003/0221047 A1 Nov. 27, 2003

(51) Int. Cl.$^7$ ............................................. G06F 12/08
(52) U.S. Cl. ..................................... 711/173; 711/103
(58) Field of Search ................................ 711/103, 170, 711/173; 707/206

(56) References Cited

U.S. PATENT DOCUMENTS 5,933,847 A * 8/1999 Ogawa ....................... 711/103
6,604,168 B2 * 8/2003 Ogawa ....................... 711/103

* cited by examiner

*Primary Examiner*—Kevin L. Ellis
(74) *Attorney, Agent, or Firm*—Park, Vaughan & Fleming LLP

(57) ABSTRACT

One embodiment of the present invention provides a system for deleting objects from a memory in a computing device, wherein the memory includes both a volatile memory and a non-volatile memory that is writeable. During operation, the system receives a request to perform an object deletion operation, which locates and deletes unused objects from the memory. In response to this request, the system performs the object deletion operation by first performing a marking operation that marks objects that are reachable in the non-volatile memory. This marking operation does not directly mark the objects in the non-volatile memory, but instead marks data values in the volatile memory that are associated with the objects. In this way, unnecessary write operations to non-volatile memory are avoided. Next, the system performs a sweep operation that deletes unmarked objects from the non-volatile memory.

31 Claims, 4 Drawing Sheets

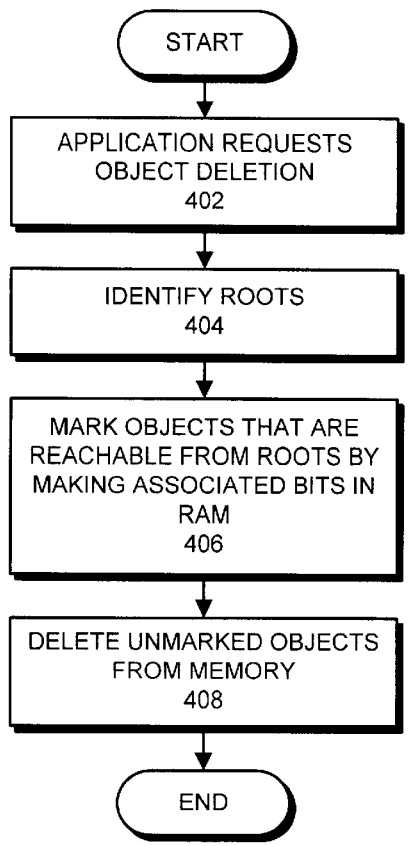
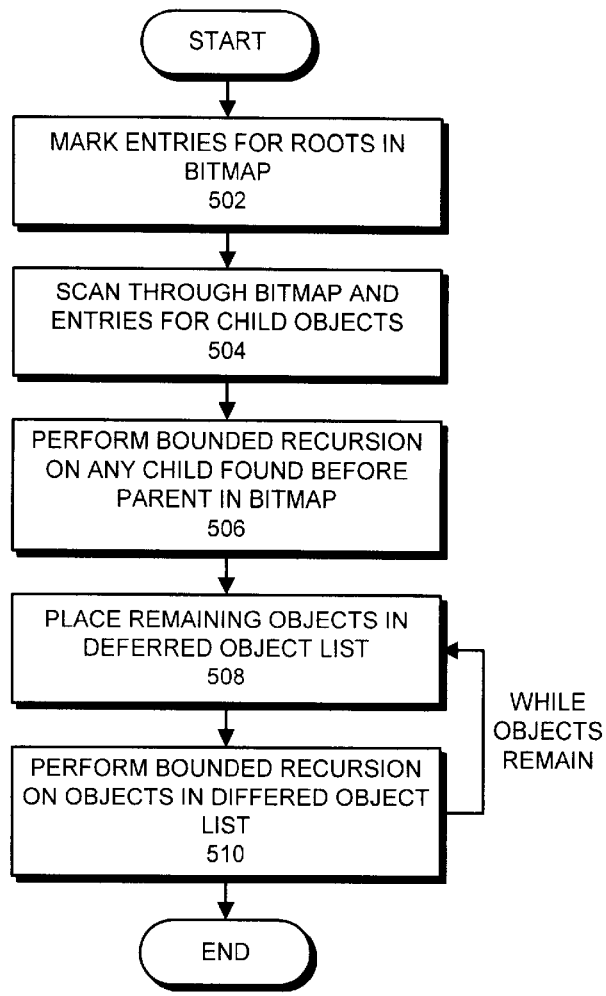
FIG. 4
FIG. 5

METHOD AND APPARATUS FOR DELETING OBJECTS FROM MEMORY WITHIN A SMART CARD

RELATED APPLICATIONS

The subject matter of this application is related to the subject matter in a co-pending non-provisional application by Michael K. Saltz filed on the same day as the instant application entitled, "Memory Management To Support Object Deletion on a Smart Card", having Serial Number TO BE ASSIGNED, and filing date TO BE ASSIGNED.

The subject matter of this application is also related to the subject matter in a co-pending non-provisional application by Michael K. Saltz filed on the same day as the instant application entitled, "Memory Management System Supporting Deletion of Transient Objects", having Serial Number TO BE ASSIGNED, and filing date TO BE ASSIGNED.

BACKGROUND

1. Field of the Invention

The present invention relates to the process of managing memory in a computer system. More specifically, the present invention relates to a method and an apparatus for deleting objects from memory in a computing device, such as a smart card.

2. Related Art

Dramatic advances in computer technology presently make it possible to integrate a significant amount of computing power onto a "smart card". This increased computing power enables smart cards to support larger numbers of applications. However, unlike conventional computing systems, smart card-based computing systems do not presently provide a mechanism for reclaiming memory occupied by objects that are no longer in use. This process of reclaiming unused memory is often referred to as "garbage collection".

Garbage collection can be performed in conventional computing systems using a number of well-known techniques. However, smart card-based computing systems are different than conventional computing systems because objects (or portions of objects) can reside in writeable non-volatile memory, such as electrically erasable programmable read only memory (EEPROM) or flash memory.

Existing garbage collection techniques are not suitable for EEPROM or flash memory because individual memory elements in EEPROM and flash memory can only be written to a limited number of times. Hence, existing garbage collection techniques, which operate by frequently marking objects in memory, can dramatically reduce the life expectancy of EEPROM or flash memory. Moreover, the process of performing write operations to EEPROM or flash memory is typically very slow, which can significantly degrade system performance.

Smart cards often contain a small amount of volatile random access memory (RAM), which does not suffer from the above-mentioned problems of writeable non-nonvolatile memory. However, the amount of RAM that is available on a smart card is often limited. Hence, it is not possible to store a complete image of EEPROM or flash memory in RAM; even a bitmap representing blocks of EEPROM or flash memory would take up too much space in RAM. Moreover, commonly used recursive techniques mark objects take up too much stack space in RAM.

Hence, what is needed is a method and an apparatus for deleting objects from memory within a computing device, such as a smart card, without the problems described above.

SUMMARY

One embodiment of the present invention provides a system for deleting objects from a memory in a computing device, wherein the memory includes both a volatile memory and a non-volatile memory that is writeable. During operation, the system receives a request to perform an object deletion operation, which locates and deletes unused objects from the memory. In response to this request, the system performs the object deletion operation by first performing a marking operation that marks objects that are reachable in the non-volatile memory. This marking operation does not directly mark the objects in the non-volatile memory, but instead marks data values in the volatile memory that are associated with the objects. In this way, unnecessary write operations to non-volatile memory are avoided. Next, the system performs a sweep operation that deletes unmarked objects from the non-volatile memory.

In a variation on this embodiment, the request to perform the object deletion operation is received from an application program.

In a variation on this embodiment, the object deletion operation takes place during a time interval between requests from the application program.

In a variation on this embodiment, performing the marking operation involves first identifying roots within the memory, and then marking objects that are directly or indirectly reachable through references from the roots. Note that the roots can be located by examining static variables that point to objects, or by examining an applet table that contains references to applet objects.

In a variation on this embodiment, the data values in the volatile memory are stored as a bitmap in the volatile memory. This bitmap includes a bit corresponding to each object located within the non-volatile memory. Space for this bitmap can be allocated from unused stack space within the volatile memory.

In a variation on this embodiment, the marking operation is performed through an iterative process that does not use unbounded recursion. This avoids the need for a large amount of stack space to perform an unbounded recursive marking operation.

Note that the computing device can be located within a smart card that can be part of, an identification card, a client loyalty card, or an electronic wallet, or can be located within a cellular phone, or a data card.

Furthermore, the non-volatile memory that is writeable can include: an electrically erasable read only memory (EEPROM), a flash memory, or a magnetic memory device.

BRIEF DESCRIPTION OF THE FIGURES

FIG. 4 is a flow chart illustrating the process of performing object deletion in accordance with an embodiment of the present invention.

FIG. 5 is a flow chart illustrating the process of marking objects in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Smart Card

Figure 1:
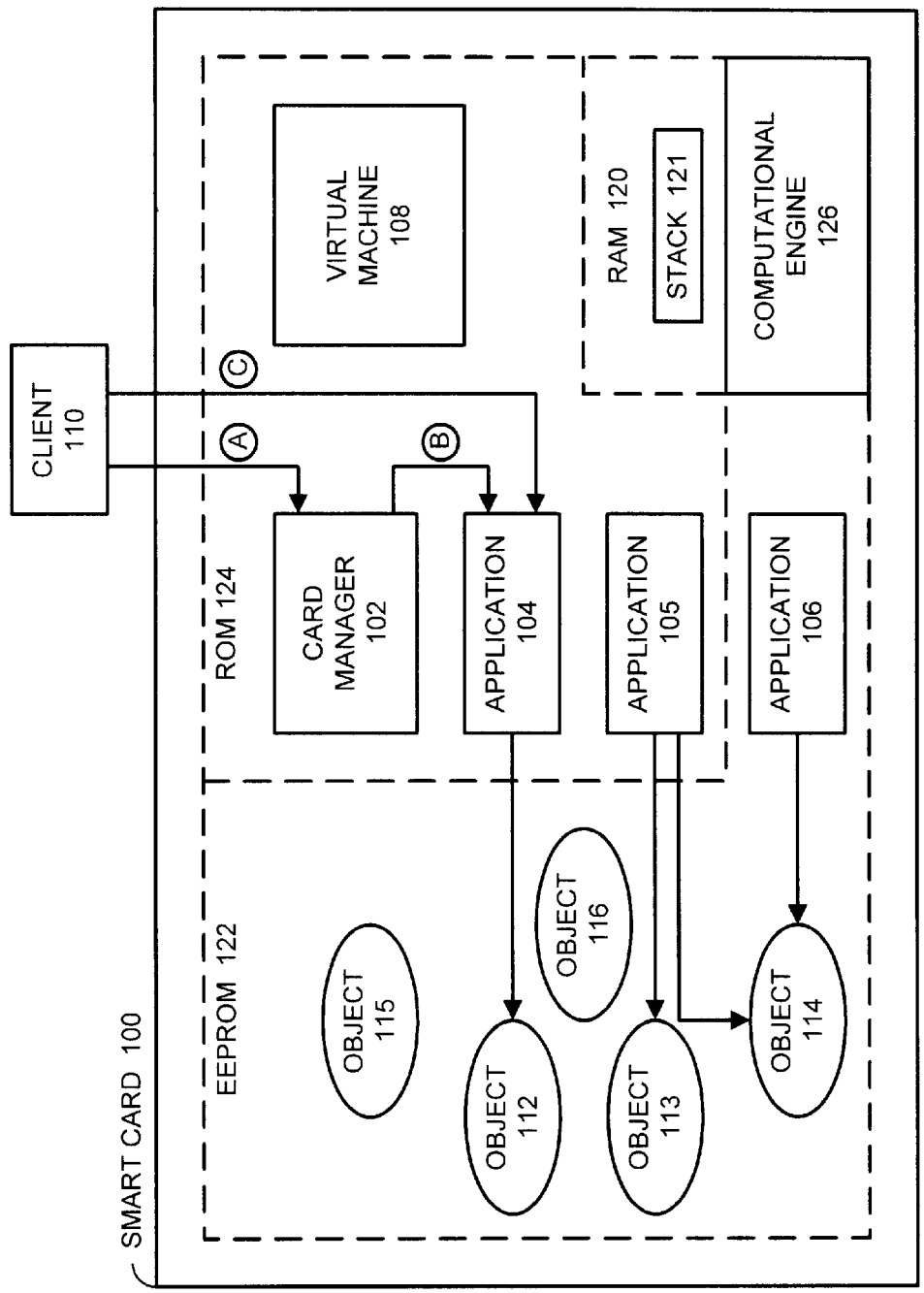
FIG. 1 illustrates a smart card in accordance with an embodiment of the present invention.

FIG. 1 illustrates a smart card 100 in accordance with an embodiment of the present invention. Smart card 100 can generally include any type of miniature computing device, such as may be located within identification cards, client loyalty cards, electronic wallets, data cards and cellular telephones. However, note that the present invention is not meant to be limited to smart cards, and can generally be applied to any type of computing device or computer system that stores objects in writeable non-volatile memory.

Smart card 100 contains a computational engine 126, which includes circuitry for performing computational operations. Smart card 100 also contains a number of different types of memory, including random access memory (RAM) 120, electrically erasable programmable read-only memory (EEPROM) 122 and read-only memory (ROM) 124.

In general, RAM 120 can include any type of volatile random access memory; EEPROM 122 can include any type of writeable non-volatile memory, such as EEPROM, flash memory, or magnetic memory; and ROM 124 can include any type of read-only memory.

RAM 120 is used to store various data items and data structures, such as a system stack 121. System stack 121 is described in more detail below with reference to FIG. 3.

ROM 124 includes a virtual machine 108, such as the JAVA virtual machine developed by SUN Microsystems, Inc. of Santa Clara, Calif. Note that applications written in a platform-independent programming language, such as the JAVA programming language, can be executed on virtual machine 108.

ROM 124 also contains a number of applications, 104 and 105, which provide services for clients accessing smart card 100. Other applications, such as application 106, can be located in EEPROM 122. Yet other applications (not illustrated) may be located in both ROM 124 and EEPROM 122.

ROM 124 may also include a card manager 102, which contains code for managing the execution of applications on smart card 100. For example, suppose a client 110 wishes to access a service provided by one of the applications 104–106 on smart card 100. Client 110 first communicates with card manager 102 (step A). Card manager 102 puts client 110 in contact with an application 104 (step B). This allows client 110 to communicate directly with application 104 (step C). Note that card manager 102 can also delete objects from memory. This object deletion process is described in more detail below with reference to FIGS. 2–5.

EEPROM 122 contains a number of objects 112–114, which are accessed by applications 104–105. More specifically, application 104 accesses object 112, application 105 accesses objects 113 and 114, and application 106 accesses object 114. Other objects 115–116 (that have become unlinked) are not referenced by any application. It is desirable to delete these unreferenced objects to free up memory space in EEPROM 122. The process of deleting these unreferenced objects is described in more detail below with reference to FIGS. 2–5.

Also, note that some objects or portions of objects may be located within RAM 120.

Roots and Objects

Figure 2:
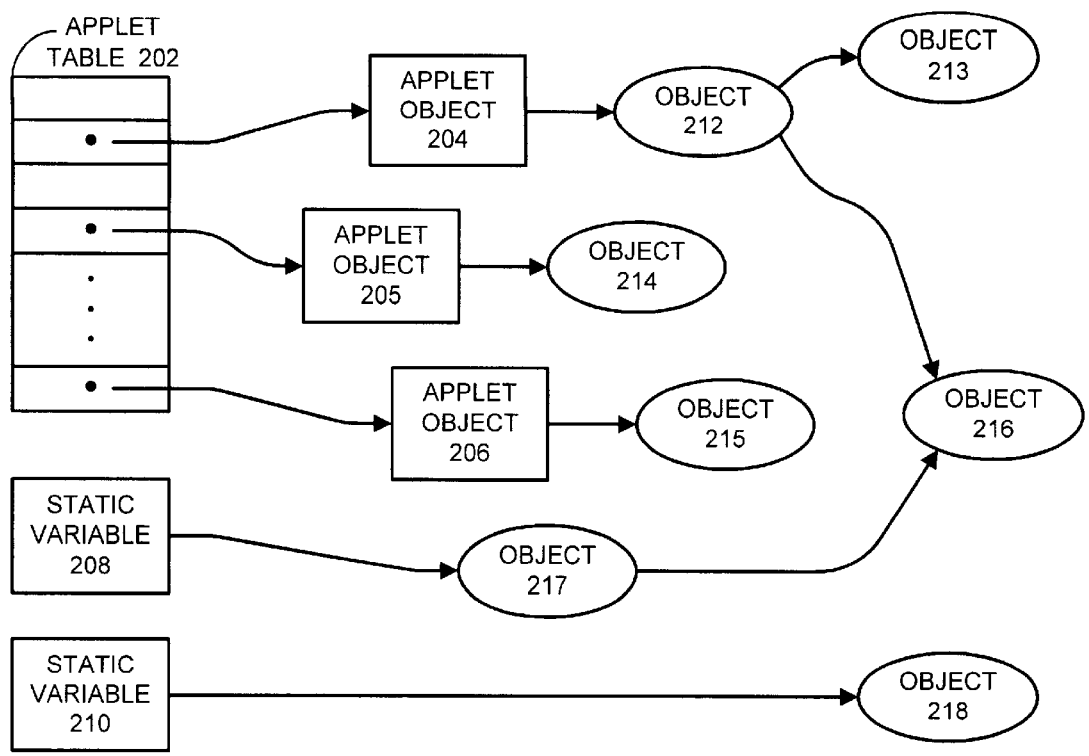
FIG. 2 illustrates a number of roots and associated objects in accordance with an embodiment of the present invention.

FIG. 2 illustrates a number of roots and associated objects in accordance with an embodiment of the present invention. During the object deletion process, the system first performs a marking process, which "marks" all objects that are reachable in memory. This is accomplished by following chains of references from "roots", such as applet table 202 and static variables 208 and 210, to find reachable objects.

Note that applet table 202 points to a number of applet objects 204–206. (These applet objects can be through of as containing portions of an application.) The applet objects themselves point to other objects. More specifically, applet object 204 points to object 212, which points to objects 213 and 216. Furthermore, applet object 205 points to object 214, and applet object 206 points to object 215.

Static variables 208 and 210 point to other objects. More specifically, static variable 208 points to object 217, which points to object 216, and static variable 210 points to object 218.

Data Structures

Figure 3:
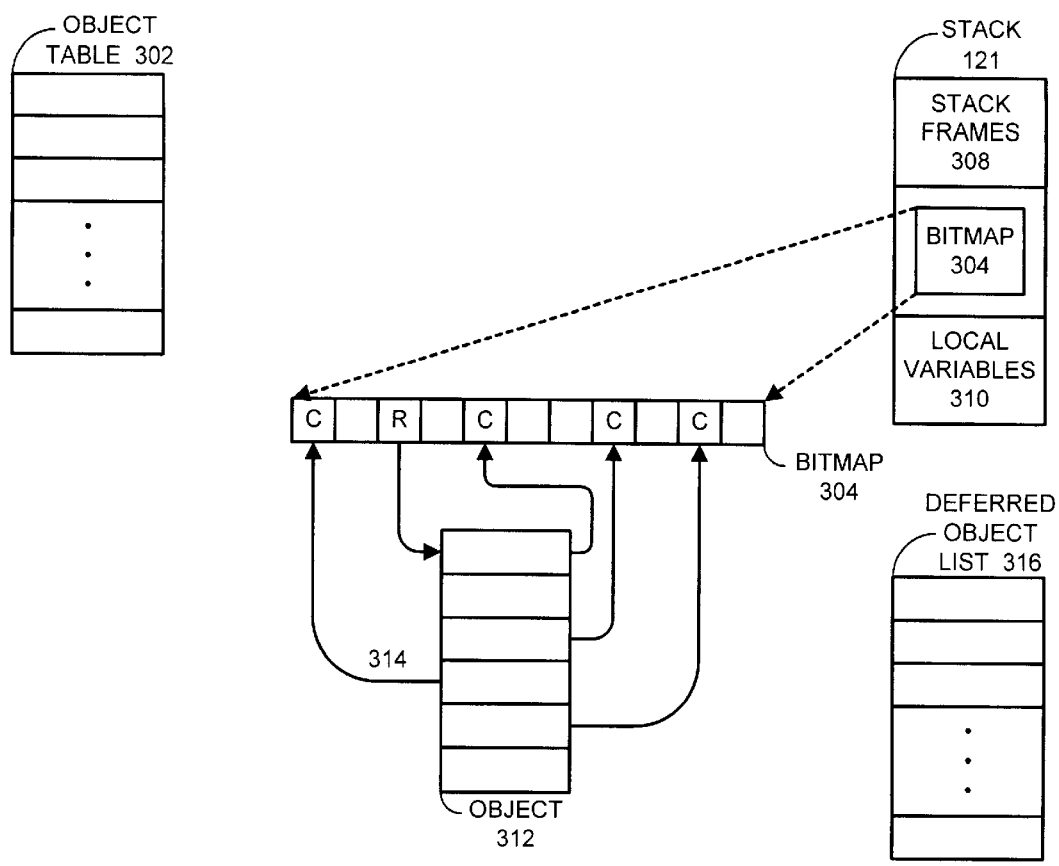
FIG. 3 illustrates data structures involved in the marking process in accordance with an embodiment of the present invention.

FIG. 3 illustrates data structures involved in the marking process in accordance with an embodiment of the present invention. These data structures include object table 302. Object table 302 is indexed by an object identifier and contains an entry for each object that exists in EEPROM 122 (and possibly for objects that exist in RAM 120). Each entry in object table 302 contains a pointer to the object.

In order to avoid unnecessary writes to EEPROM 122 during the marking process, the system maintains a bitmap 304 in RAM 120. Bitmap 304 contains a "marking bit" for each object defined in object table 302.

In order to conserve space in RAM 120, bitmap 304 can be located within unused regions of stack 121. During the marking process, normal application execution operations are not taking place. Hence, stack 121 is not full of stack frames 308 or local variables 310. This leaves space in stack 121 that can be temporarily allocated to bitmap 304.

FIG. 3 also illustrates an object 312 located in EEPROM 122 as well as a deferred object list 316, which is located in RAM 120. Deferred object list 316 is used to avoid unbounded recursion during the marking process as is described below with reference to FIG. 5.

Object Deletion Process

FIG. 4 is a flow chart illustrating the process of performing object deletion in accordance with an embodiment of the present invention. This object deletion process can start when an application requests object deletion operation (step 402).

In one embodiment of the present invention, the system provides an application programming interface (API) that includes the call, isObjectDeletionSupported( )

which allows an application to determine if object deletion is supported by the system. The API also includes the call requestObjectDeletion( )
which allows the application to explicitly initiate object deletion.

Next, the system identifies roots from which to start the marking process (step 404). As mentioned above, the roots can be identified by examining the applet table and static variables.

Next, the system marks all objects that are reachable from the roots (step 406) by marking bits in bitmap 304 (which is located in RAM 120) instead of marking the objects themselves (which are located in EEPROM 122). This avoids unnecessary write operations to EEPROM 122. This marking process is described in more detail below with reference to FIG. 5.

Finally, the system performs a "sweep" operation, which deletes all unmarked objects from memory and frees up the memory space used by the deleted objects (step 408).

Marking Process

FIG. 5 is a flow chart illustrating the process of marking objects in accordance with an embodiment of the present invention. The system starts by marking bits associated with roots in bitmap 304 (step 502). Next, the system starts at the beginning of bitmap 304 and scans through bitmap 304 marking entries for corresponding child objects (step 504). For each marked entry located in bitmap 304, the entries for corresponding child objects are marked by first looking up the location of the object 312 in object table 302, and then examining references from object 312 to identify child objects pointed to by object 312. This allows the system to mark corresponding entries in bitmap 304 for these child objects. For example, in FIG. 3, a root, which is indicated by the letter "R" in bitmap 304, corresponds to object 312. Object 312 refers to a number of child objects whose entries in bitmap 304 are indicated with the letter "C".

Since objects are allocated sequentially in bitmap 304, child objects will generally appear later in bitmap 304 than their parent object because child objects are generally allocated after their parent object is allocated. If this is always the case, only a single pass through bitmap 304 is required to mark all reachable objects.

However, in some cases, a child object may occur prior to its parent in bitmap 304. For example, in FIG. 3, object 312 contains a reference 314 to a child object that precedes the parent object 312. In this case, the system performs a bounded recursion operation on the child object to locate the child's descendents (step 506). Note that this bounded recursion operation is similar to a normal recursive marking process in a conventional "mark and sweep" garbage collector. The only difference is that this recursion operation is bounded to go at most a fixed number of levels deep (for example, four levels), so that the recursion process occupies a bounded amount of stack space.

Any objects that still remain after the bounded recursion operation completes are placed in deferred object list 316 (step 508). Next, the system performs bounded recursion on the objects in deferred object list 316 (step 510). Steps 508 and 510 are repeated while object remain to be examined. If deferred object list 316 becomes too full, the system starts another scan through bitmap 304. Note that the maximum recursion depth and the size of deferred object list 316 can be tuned to achieve optimal performance.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for deleting objects from a memory in a computing device, wherein the memory includes both a volatile memory and a non-volatile memory that is writeable, the method comprising:

receiving a request to perform an object deletion operation that locates and deletes unused objects from the memory; and in response to the request, performing the object deletion operation by, performing a marking operation that marks objects that are reachable in the non-volatile memory, wherein the marking operation does not directly mark the objects in the non-volatile memory, but instead marks data values in the volatile memory that are associated with the objects, so that unnecessary write operations to non-volatile memory are avoided, and performing a sweep operation that deletes unmarked objects from the non-volatile memory.

2. The method of claim 1, wherein the request to perform the object deletion operation is received from an application program.

3. The method of claim 2, wherein the object deletion operation takes place during a time interval between requests from the application program.

4. The method of claim 1, wherein performing the marking operation involves:

identifying roots within the memory; and marking objects that are directly or indirectly reachable through references from the roots.

5. The method of claim 4, wherein the roots can be located within:

static variables that point to objects; and an applet table that contains references to applet objects.

6. The method of claim 1, wherein the data values in the volatile memory are stored as a bitmap in the volatile memory; and wherein the bitmap includes a bit corresponding to each object located within the non-volatile memory.

7. The method of claim 6, wherein space for the bitmap is allocated from unused stack space within the volatile memory.

8. The method of claim 1, wherein the marking operation is performed through an iterative process that does not use unbounded recursion, thereby avoiding the need for a large amount of stack space to perform an unbounded recursive marking operation.

9. The method of claim 1, wherein the computing device is located within a smart card that can be part of, an identification card, a client loyalty card, or an electronic wallet; or wherein the computing device is located within, a cellular phone or a data card.

10. The method of claim 1, wherein the non-volatile memory that is writeable can include one of:

an electrically erasable read only memory (EEPROM);

a flash memory; and a magnetic memory device.

11. A computer-readable storage medium storing instructions that when executed by a computer cause the computer to perform a method for deleting objects from a memory in a computing device, wherein the memory includes both a volatile memory and a non-volatile memory that is writeable, the method comprising:

receiving a request to perform an object deletion operation that locates and deletes unused objects from the memory; and in response to the request, performing the object deletion operation by, performing a marking operation that marks objects that are reachable in the non-volatile memory, wherein the marking operation does not directly mark the objects in the non-volatile memory, but instead marks data values in the volatile memory that are associated with the objects, so that unnecessary write operations to non-volatile memory are avoided, and performing a sweep operation that deletes unmarked objects from the non-volatile memory.

12. The computer-readable storage medium of claim 11, wherein the request to perform the object deletion operation is received from an application program.

13. The computer-readable storage medium of claim 12, wherein the object deletion operation takes place during a time interval between requests from the application program.

14. The computer-readable storage medium of claim 11, wherein performing the marking operation involves:

identifying roots within the memory; and marking objects that are directly or indirectly reachable through references from the roots.

15. The computer-readable storage medium of claim 14, wherein the roots can be located within:

static variables that point to objects; and an applet table that contains references to applet objects.

16. The computer-readable storage medium of claim 11, wherein the data values in the volatile memory are stored as a bitmap in the volatile memory; and wherein the bitmap includes a bit corresponding to each object located within the non-volatile memory.

17. The computer-readable storage medium of claim 16, wherein space for the bitmap is allocated from unused stack space within the volatile memory.

18. The computer-readable storage medium of claim 11, wherein the marking operation is performed through an iterative process that does not use unbounded recursion, thereby avoiding the need for a large amount of stack space to perform an unbounded recursive marking operation.

19. The computer-readable storage medium of claim 11, wherein the computing device is located within a smart card that can be part of, an identification card, a client loyalty card, or an electronic wallet; or wherein the computing device is located within, a cellular phone or a data card.

20. The computer-readable storage medium of claim 11, wherein the non-volatile memory that is writeable can include one of:

an electrically erasable read only memory (EEPROM);

a flash memory; and a magnetic memory device.

21. An apparatus that performs an object deletion operation that deletes objects from a computing device, comprising:

a memory within the computing device, wherein the memory includes both a volatile memory and a non-volatile memory that is writeable;

a marking mechanism that is configured to mark objects that are reachable in the non-volatile memory;

wherein the marking mechanism does not directly mark the objects in the non-volatile memory, but instead marks data values in the volatile memory that are associated with the objects, so that unnecessary write operations to nonvolatile memory are avoided; and a deletion mechanism that is configured to delete unmarked objects from the non-volatile memory.

22. The apparatus of claim 21, further comprising a receiving mechanism that is configured to receive request to perform the object deletion operation from an application program.

23. The apparatus of claim 22, wherein the object deletion operation takes place during a time interval between requests from the application program.

24. The apparatus of claim 21, wherein the marking mechanism is configured to:

identify roots within the memory; and to mark objects that are directly or indirectly reachable through references from the roots.

25. The apparatus of claim 24, wherein the roots can be located within:

static variables that point to objects; and an applet table that contains references to applet objects.

26. The apparatus of claim 21, wherein the data values in the volatile memory are stored as a bitmap in the volatile memory; and wherein the bitmap includes a bit corresponding to each object located within the non-volatile memory.

27. The apparatus of claim 26, wherein space for the bitmap is allocated from unused stack space within the volatile memory.

28. The apparatus of claim 21, wherein the marking mechanism is configured to perform an iterative process that does not use unbounded recursion, thereby avoiding the need for a large amount of stack space to perform an unbounded recursive marking operation.

29. The apparatus of claim 21, wherein the computing device is located within a smart card that can be part of, an identification card, a client loyalty card, or an electronic wallet; or wherein the computing device is located within, a cellular phone or a data card.

30. The apparatus of claim 21, wherein the non-volatile memory that is writeable can include one of:

an electrically erasable read only memory (EEPROM);

a flash memory; and a magnetic memory device.

31. A means for performing an object deletion operation that deletes objects from a memory in a computing device, comprising:

a memory means including both a volatile memory and a non-volatile memory that is writeable;

a marking means for marking objects that are reachable in the non-volatile memory;

wherein the marking means does not directly mark the objects in the nonvolatile memory, but instead marks data values in the volatile memory that are associated with the objects, so that unnecessary write operations to non-volatile memory are avoided; and a deletion means for deleting unmarked objects from the non-volatile memory.

* * * * *